Dec. 8, 1959  W. H. MIDDENDORF  2,916,675
MEANS FOR PREVENTING INTERCHANGEABILITY OF CIRCUIT BREAKERS
OF SIMILAR CONSTRUCTION BUT DIFFERENT CAPACITY
Filed Jan. 9, 1957
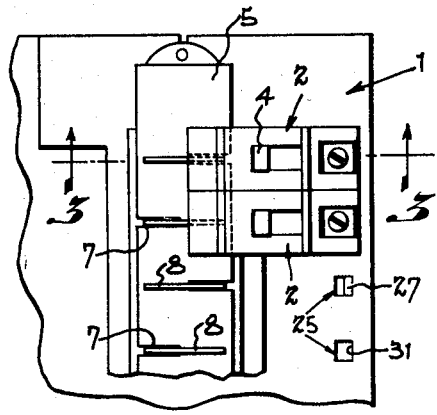
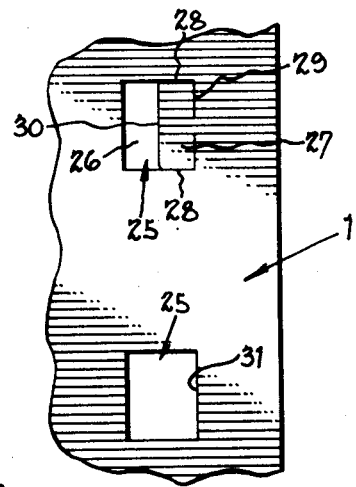
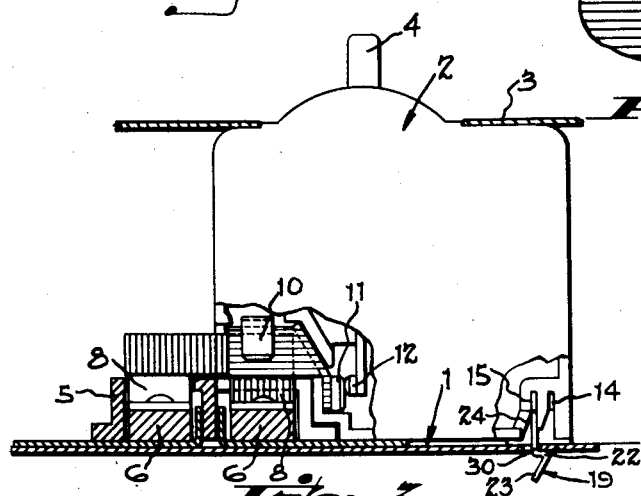
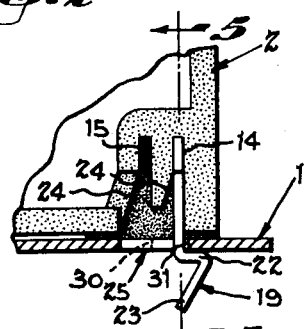
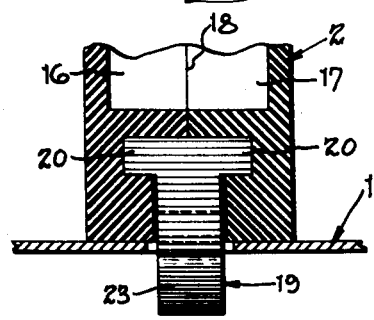
INVENTOR.
William H. Middendorf,
BY
Wood, Herron & Evans.
ATTORNEYS.

United States Patent Office 2,916,675
Patented Dec. 8, 1959

2,916,675

MEANS FOR PREVENTING INTERCHANGEABILITY OF CIRCUIT BREAKERS OF SIMILAR CONSTRUCTION BUT DIFFERENT CAPACITY

William H. Middendorf, Covington, Ky., assignor to The Wadsworth Electric Manufacturing Co. Inc., Covington, Ky., a corporation of Kentucky Application January 9, 1957, Serial No. 633,367

2 Claims. (Cl. 317—119)

This invention relates to protective devices for electrical circuits and is directed to a panelboard upon which one or a plurality of circuit breakers may be mounted, and means selectively operable in relation to the capacity of each circuit breaker for fastening the circuit breaker to the panelboard.

A principal objective of the invention has been to provide an improvement through which a circuit breaker of relatively high capacity cannot inadvertently be installed upon the panelboard in a position wherein a circuit breaker of lower capacity only should be installed.

In modern load centers a plurality of circuit breakers are mounted in side-by-side relationship to one another in a sheet metal housing on a panelboard or other suitable support. Each circuit breaker is electrically connected to one or more circuits which it is intended to protect against excessive overload. The loads connected to the various distribution circuits, of course, will vary during use, but the maximum connected load served by one circuit breaker sometimes will be appreciably different than the maximum load connected to another circuit of the load center, because of which circuit breakers of different load sustaining capacities are required, just as 15, 20, or 30 ampere fuses are required in fusible type load centers which the circuit breaker type equipment is commercially replacing.

When a fuse burns out, it is replaced in the fuse socket by a new fuse of the same capacity. A circuit breaker, instead of burning out under overload, trips automatically to open circuit position, but a handle is provided for manually resetting the circuit breaker to a position in which the circuit is reclosed; hence, a circuit breaker is not thrown away after it performs its protective function. However, it is essential that circuit breakers of the correct capacity be installed originally or be replaced by circuit breakers of the same capacity if replacement is necessary for some reason. Although each circuit breaker is marked plainly with its rated capacity, still, for reasons of manufacturing economy, two circuit breakers of entirely different capacity may look exactly alike. The principal objective of this invention has been to provide an improvement through which a circuit breaker of high capacity but similar in external shape or size to one of low capacity cannot be installed either deliberately or by mistake as a replacement in a load center in a position intended to be occupied by a circuit breaker of low rated capacity. If a high capacity breaker is installed in a light load circuit which requires protection by a breaker of lower rating, perhaps inadvertently or perhaps deliberately to avoid the bothersome tripping of a low capacity circuit breaker connected in an overloaded circuit, the circuit itself becomes actually unprotected against overload since the high capacity breaker will sustain, as normal, a current of magnitude sufficient to trip the breaker of lower rating, and the circuit will thereby remain dangerously overloaded and fire may result.

A circuit breaker may be mounted on a panelboard by means of fastening screws, and electrical connections to the circuit breaker may be provided by jumpers or straps extending to the terminals of the breaker from feed line bus bars provided in the load center casing. However, to reduce the time required for the electrician to insert fastening screws and manipulate or attach wires to screw-type terminals, circuit breakers have been provided in which one or both terminals comprises jaws adapted for sliding interconnection with blade-like members electrically interconnected with one or more bus bars. Circuit breakers also have been provided in which simple locking means other than fastening screws cooperable with the panelboard are utilized for physically sustaining circuit breakers in position thereon. One such arrangement, for example, is shown in Myers U.S. Patent 2,733,386, issued January 31, 1956 wherein one terminal of the circuit breaker comprises jaws adapted frictionally to engage a blade or prong extending from a bus bar disposed over the panelboard and insulated therefrom, while the breaker, at the other end, is positioned to be held beneath panelboard cleat or hook extending upwardly over a base portion of the circuit breaker. In this and other types of units, the circuit breaker is installed upon the panelboard by engaging its base portion beneath the hook, then swinging it arcuately in relation to the cleat so that the jaws at its opposite end engage the prong or blade extending from the feed bus. The other electrical terminal of the circuit breaker may be of any suitable construction.

The present invention contemplates a detent and cooperable latching edge or shoulder, one on the circuit breaker and the other on the panelboard, as the means for interconnecting a circuit breaker with the panelboard. However, in accordance with this invention, the position occupied by the detent and the position occupied by the latching edge or shoulder are selective in relation to breaker capacity and circuit loading. The manufacturer of the circuit breaker determines or sets the position of one of the cooperable elements at the time the breaker is fabricated, and the electrician who initially installs the equipment selects or sets the position of the other of the elements in relation to the loading which the distribution circuit is intended to sustain. Therefore, a circuit breaker may be installed to serve that circuit only when the detent and aperture or latching surface elements occupy positions in which they are cooperable, and a circuit breaker having a higher capacity, in which the selected position of its element of the pair is different, cannot be installed at the panelboard location.

In the preferred construction, the aperture presenting the latching edge element is located in the panelboard and the cooperable detent is made a part of the circuit breaker. To selectively position the detent in relation to the rated capacity of the breaker, the breaker is provided with two or more cavities, in any one of which the detent may be installed, whereby the manufacturer, upon assembly of the breaker, may locate the detent in a recess position in accordance with the maximum sustained load capacity for which that breaker is calibrated or constructed. In the preferred construction, the position of the latching edge is provided or determined by an aperture having one or more selectively removable adjacent knock-out portions wherein the edge of the knock-out constitutes a first latching edge which disappears upon removal of that knock-out to expose a second latching edge positionally spaced from the first. The second latching edge may be delineated by the aperture per se or by an edge portion of a second knock-out arranged adjacent the first.

When the detent of the circuit breaker is in a recess position denoting high rated capacity, it is cooperable with the first latching edge, but if the electrician, upon installation of the equipment, has removed a knock-out, with the intent that only a breaker of lower capacity should be installed in that position on the panelboard, then the detent in the high capacity position on the circuit breaker will have no edge with which to cooperate, and engagement of that circuit breaker with the panelboard cannot be effected. However, when the detent on the circuit breaker is in a second position denoting a lower capacity, then the second latching edge exposed by removal of the knock-out will be cooperable with that detent, and a proper engagement of the circuit breaker with the panelboard may be effected.

In substance, therefore, the deliberate removal of a knock-out by the electrician connotes a circuit load limitation while the position of a detent in the circuit breaker, set by the manufacturer, connotes a circuit breaker rating, and installation of a circuit breaker upon the panelboard may be effected only when the limitation and the rating are in conformity; when the limitation and rating are not in conformity, interengagement or combination of the elements with one another is prevented by obstruction or by clearance. As many detent positions and knock-outs may be employed as are necessary to suit varying circuit requirements, but for most purposes two positions are all that are necessary as a practical matter, one conforming to circuit loading of, say, 15 or 20 amperes and the other conforming to, say, 50 amperes.

In place of mounting the detent on the circuit breaker in selective position denoting capacity and providing means on the panelboard for determining the position of the latching edge, the reverse construction may readily be employed wherein the panelboard is provided with a selectively settable detent, and the circuit breaker, or casing thereof, is provided with a selectively adjustable or positionable aperture for cooperation therewith. It will be understood, therefore, that either embodiment is contemplated by this invention.

A typical embodiment of this invention is illustrated in the accompanying drawings in which:

Figure 1 is a plan view showing circuit breakers associated with a panelboard illustrated fragmentarily;

Figure 2 is a plan view on an enlarged scale showing apertures in the panelboard for receiving detents of circuit breakers;

Figure 3 is an elevation showing a circuit breaker mounted on a panelboard, the electrical bus structure and associated circuit breaker terminal connected thereto being illustrated in cross section;

Figure 4 is a view similar to Figure 3 but showing the bottom portion of a circuit breaker and detent mountable thereon in different positions; and Figure 5 is a sectional view taken on the line 5—5 of Figure 4.

The combination shown in the drawings comprises a panelboard indicated generally at 1 and circuit breakers indicated generally at 2. It will be understood that the panelboard is intended or adapted to be mounted in a sheet metal box (not shown) in any suitable manner in accordance with usual practice and that the box may be provided with a hinged cover and a so-called dead front 3. Each of the circuit breakers 2 is provided with an operating handle 4, and the dead front may be a plain panel having apertures therein through which the handle or handle housing portions of the circuit breakers may project whereby the remaining portions of the circuit breakers and the electrical conductors and terminals will be concealed against tampering or inadvertent accessibility.

In the construction shown, the panelboard 1 comprises a central insulator block 5 within which are housed bus bars or feeders 6 to which electric main conductors are connected in the usual manner. The insulating block 5, at spaced intervals, is slotted as at 7 to receive blade-like stationary terminal connectors 8, one or more for each distribution circuit. In the construction illustrated, alternate terminal blades 8 are in electrical connection with respective bus bars 6, and they extend alternately toward the right and left-hand sides of the panelboard 1 from or above the insulator housing 5 which is located at the central portion of the panelboard.

Each blade 8 electrically serves a circuit breaker; for example, the circuit breaker has contact jaws 9 which are spaced apart from one another to receive a blade 8 therebetween in a sliding, frictional "plug-in" type of fit. To promote security of contact, spring member 10 may be arranged in each circuit breaker to straddle the spaced jaws 9 thereof and thereby bias them toward one another. Each circuit breaker comprises a stationary contact 11, and a contact 12 cooperable therewith for circuit completion and disruption through and by the breaker. Each circuit breaker also includes means responsive to circuit overload, either thermally or magnetically or both, for automatically disengaging the movable contact 12 from the stationary contact 11 in event of overload. Handle 4 is movable to reset contact 12 in engagement with the stationary contact after it has been tripped or to disengage the contacts manually if a circuit is to be opened manually. The mechanism within the housing of the circuit breaker 2 for engaging and disengaging contacts 11 and 12 either automatically or manually may be of any suitable type, and since those skilled in the art are familiar with such mechanisms, they are not shown here.

In a construction of the type described, the frictional engagement of the blade projecting from the bus bar 6 by the jaws 9 of the circuit breaker not only interconnects contact 11 of the circuit breaker with the bus but also physically supports the forward portion of the circuit breaker upon the panelboard, at least to some degree. Dead front 3 engaging the top of the circuit breaker may also provide support, but it is nevertheless desirable, for safety reasons, to fasten or secure more rigidly the rearward end of the circuit breaker in order to prevent impairment of electrical contact through undue mechanical strain or to prevent movement of each circuit breaker from its bus should the load center be mounted in an area where it is subjected to mechanical vibration. Therefore, it is the accepted practice to utilize a fastening for the rear end of the circuit breaker or, where screw-type terminals are used, at both ends of the circuit breaker.

As shown in Figures 3 and 4, in accordance with the present invention, the rearward end of the circuit breaker having the usual feet at the bottom is provided internally with spaced cavities 14 and 15. In a circuit breaker housing which comprises meeting halves 16 and 17, as is shown in Figure 5, these cavities may be provided as recesses extending laterally from the meeting line 18 at which the cavities join one another. The cavities 14 and 15 are similar to one another and each is adapted to receive and hold a detent member indicated generally at 19 which is made of yieldable metal. The upper portion of the detent may be of T-shape, the endwise portion of the T being adapted to be received in lateral extensions 20, 20 respectively of the cavities 14 and 15 of the case, while the remainder of the detent projects outwardly or downwardly beyond the bottom or foot portion of the circuit breaker. The detent 19 of each circuit breaker, at a level spaced from the bottom or foot, comprises an offset or shoulder 22 below which the detent has an angulated lead portion 23. The forward faces of the recesses 14 and 15 in the circuit breaker housing are angulated as at 24 to provide clearance permitting the shoulder portion 22 of detent 19, when in either recess, to be moved forwardly in a yieldable manner.

Panelboard 1 has apertures 25 therein, one for each circuit breaker, as is shown in Figures 1 and 2. Each aperture 25 comprises a cut-away opening 26 and a knock-out portion 27. The latter is delineated by cut lines 28, 28 which may constitute extensions of the opposite edges of the cut-away opening 25, and a lateral but interrupted cut line 29 through the interuption of which the knock-out 27 is nominally held in position in the plane of the panel. The knock-out portion 27 may be pryed away simply by inserting the nose of a screwdriver through the opening 26 and prying upwardly on the knock-out portion, which then bends and breaks off.

Aperture 25 is positioned with respect to the cooperable blade 8 extending from one of the bus bars 6 so that cavity 15 of the circuit breaker housing resides generally above opening 26 of the panelboard, and recess 14 of the housing resides generally above the knock-out portion 27 adjacent the opening 26. As will be noted from Figure 1, the spacing of the parts longitudinally of the panelboard is such that the circuit breakers reside sidewisely adjacent one another.

As previously indicated, a circuit breaker is constructed or calibrated to trip, upon incidence of a predetermined overload, and thereby open a circuit through separation of its stationary contacts 11 and 12 so as to terminate the flow of overload current. In accordance with this invention, the manufacturer positions detent 19 in one of the recesses, e.g. 14, if the breaker is intended or calibrated to be used on a nominally loaded circuit, and installs the detent 19 in the cavity 15 if the circuit breaker is intended or calibrated to carry higher current. Thus, the rated capacity of the breaker determines which cavity 14 or 15, wherein the detent will be installed. Installation in the selected cavity is made at the time of assembly of the breaker whereupon the housing members of the breaker are joined or riveted together, and the position of the detent cannot thereafter be changed.

When detent 19 is positioned in cavity 15, its lead portion 23 may be projected through opening 26 and the parts are so dimensioned and related that the sloping edge of the lead portion will bear upon the exposed edge 30 of knock-out 27. Thus, downward movement of the breaker will cause the detent 19 to move yieldably until its shoulder 22 clears the lower face of the knock-out 27 whereupon the detent will snap into position with its shoulder engaging the underneath face of the knock-out 27. The circuit breaker thereby is held rigidly upon the panelboard. Should it be desirable for any reason to remove the circuit breaker, the breaker is pivoted about the detent end to disconnect jaws 9 from blade 8. Thereafter the breaker can be shifted slightly toward the blade 8 to free detent shoulder 22 from the edge 30 of the knock-out, whereupon the detent may pass through the opening 26. This is the positional arrangement of cooperable detent and latch surface elements used in those circuit breakers of the panelboard which are to be interconnected with relatively heavily loaded distribution circuits and which, therefore, require circuit breakers of a higher rated capacity, for example, 50 amperes.

For other circuits of the load center which carry lower currents, for example, 15 or 20 amperes, circuit breakers of corresponding rated capacity will be installed, which circuit breakers, as fabricated by the manufacturer, will carry detent 19 in recess 14 thereof. Since the knock-out 27 will obstruct the passage of detent 19 of a low-rated breaker, the electrician, at the time of original installation, will disengage the knockout 27, thereby exposing a new or second edge 31 for cooperative engagement with the detent 19 in its second position, as is shown in Figure 4. If more than the two positions shown are intended to be provided for the detent, then more than one knock-out portion may be arranged in the panelboard.

The removal of the knock-out from any aperture thus pre-establishes that panelboard position as a position adapted to receive only a breaker of low rated capacity. Should an attempt be made to install in that position a circuit breaker of higher capacity, i.e., one having detent 19 in recess 15, the detent will pass through the now enlarged opening but the crosswise edge 30 with which the detent should cooperate will have been removed and the circuit breaker will remain noticeably loose and unconnected, and a warning will thus be provided that the attempted installation is improper.

In the present construction the latch member may be in the form of a simple stamping selectively denoting circuit breaker capacity by the position in which it is mounted, but it will be understood that capacity may be designated by the use of detents of varying shape rather than by varying detent position, and it will also be understood that more than one set of latch and detent elements may be used for each circuit breaker, to provide further selectivity.

It will be understood that the "plug-in" type electrical connection shown in the drawings may be utilized in forms different than the one shown, and it will also be understood that in place of a plug-in type electro-mechanical connection for one end of the breaker as is shown in the drawings, the circuit breaker may comprise screw-type electrical terminals at both ends and a mechanical holding cleat of the type shown in Myers Patent 2,733,386, or a detent structure of the type disclosed herein may be utilized at the other end or at each end.

Having described my invention, I claim:

1. A circuit breaker and panel board combination comprising, at least one circuit breaker, first and second means on said circuit breaker for receiving a detent selectively in a first position or in a second position, said first and second means being spaced from each other, and denoting, respectively differing breaker capacities, a detent received by one of said detent receiving means a panel board receiving said circuit breaker, latching means on said panel board cooperating with said detent, said latching means including means forming an aperture in said panel board, a knock out portion contiguous with said aperture, said knock out portion providing a first aperture edge engageable by said detent only when said detent is received by said first detent receiving means, said knock out portion when removed leaving a second aperture edge spaced from said first aperture edge and engageable by said detent only when said detent is received by said second detent receiving means.

2. Circuit breaker apparatus comprising, a panel board, a terminal connection on said panel board, said panel board having a plurality of apertures spaced from each other and spaced from said terminal connection, a knock out portion contiguous with each of a portion of said apertures and providing a first aperture latch edge therefor, all of said first aperture latch edges being equidistant from said terminal connection, the remaining apertures providing second latch edges spaced from said terminal connections a distance differing from the distance of said first edges by the width of said knock out portions, at least one first capacity circuit breaker having one end engaging said terminal connection, and having at the other end a detent positioned in accordance with the capacity of the breaker to project into said aperture and engage said first aperture edge, at least one second capacity breaker having one end engaging said terminal connection and having at the other end a detent positioned in accordance with the capacity of its breaker to project into said aperture and engage said second aperture edge.

(References on following page)

References Cited in the file of this patent

UNITED STATES PATENTS

| | | |
|---|---|---|
| 433,770 | Cunnington | Aug. 5, 1890 |
| 2,143,342 | Beersman | Jan. 10, 1939 |
| 2,281,958 | Snavely | May 5, 1942 |
| 2,733,386 | Myers | Jan. 31, 1956 |
| 2,738,444 | Casey | Mar. 13, 1956 |
| 2,790,961 | Del Camp | Apr. 30, 1957 |

FOREIGN PATENTS

| | | |
|---|---|---|
| 594,879 | France | Mar. 25, 1925 |
| 621,316 | Great Britain | Apr. 7, 1949 |

OTHER REFERENCES

Tele Tech & Electronic Ind. page 42, August 1955.

Electronic Equipment, August 1955, Terminals for printed circuits.